UNITED STATES PATENT OFFICE.

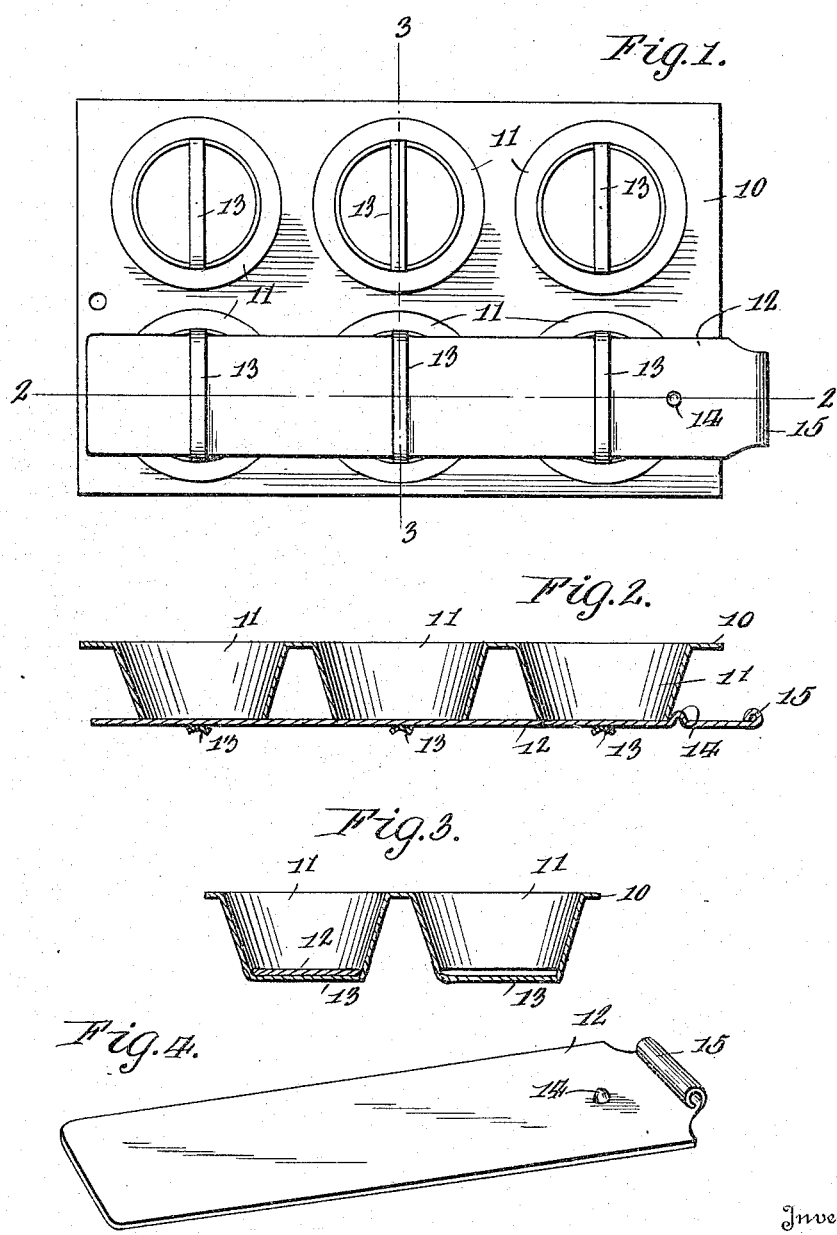

ROBERT BLUNT, OF HAWARDEN, IOWA.

COOKING UTENSIL.

1,177,226.  Specification of Letters Patent.  Patented Mar. 28, 1916.

Application filed October 27, 1913. Serial No. 797,474.

*To all whom it may concern:*

Be it known that I, ROBERT BLUNT, a citizen of the United States, residing at Hawarden, in the county of Sioux and State of Iowa, have invented certain new and useful Improvements in Cooking Utensils, of which the following is a specification.

This invention relates to a cooking utensil of the type in which muffins or cup cakes may be baked.

The principal object of the invention is to provide the pan with a removable bottom strip which is slidably connected with the cups forming a part of the pan so that the strip can be removed and the muffins or cup cakes may be easily removed from the cups.

Another object of the invention is to provide an improved means for removably connecting the bottom strip with the cups.

Another object of the invention is to provide means for limiting the sliding movement of the bottom strip in one direction.

This invention is illustrated in the accompanying drawings wherein—

Figure 1 is a bottom plan view of a muffin pan with one of the bottom strips in place; Fig. 2 is a longitudinal section taken along the line 2—2 of Fig. 1; Fig. 3 is a transverse sectional view through a muffin pan taken along the line 3—3 of Fig. 1; and Fig. 4 is a perspective view of the bottom strip.

This muffin pan is provided with a plate 10 which carries the cups or receptacles 11 in which the muffins are to be baked. It very often happens that when baking muffins or cup cakes that the cakes will stick to the bottom and sides of the cups thereby causing the bottom portion of the cakes to be broken when removing the same from the cups. A knife can be passed around the sides of the muffins or cakes to loosen the cake from the sides of the cup, but this will not loosen the bottom of the cake. In order to prevent the bottom portion of the cake from being broken, a removable bottom strip has been provided.

The pan shown in the drawings has been provided with a bottom strip 12 for each of the rows of cups 11, the strip being removably connected with the cups by means of yokes 13 which are connected with the lower edge portions of the walls of the cups and formed by cutting out the side portions of the cup bottoms. These yokes are curved transversely to hold the pan slightly above the oven bottom and thus permit air to circulate beneath the pan. The bottom plate 12 is slipped through the yokes and fits tightly against the bottoms of the cups, as shown in Figs. 2 and 3, and is limited in its sliding movement in one direction by the point 14 which is struck up from the plate. One end portion of the plate is curved to form a hand hold 15 so that the plate can be easily handled.

When using this device, the strips 12 are first put in place and the cake dough is then poured into the cups. As soon as the cakes are baked, the pan is removed from the stove and the plate is then withdrawn thus leaving the bottoms of the cakes exposed. These cakes can then be easily removed from the cups either by placing the fingers against the bottom of the cakes and pushing them outwardly or running a knife around the sides of the cakes to loosen them. A cake pan has thus been provided from which cakes can be very easily removed after they have been baked without any danger of the bottom portions of the cakes being broken.

What is claimed is:

A baking pan of the character described including a plurality of cups, the bottom portion of each cup being cut away to provide a bar extending transversely across the open lower end of the cup, and a closure strip extending beneath the lower ends of said cups and held in engagement with the walls thereof by said bars, said bars serving to hold said closure strip in spaced relation to the flooring of an oven to permit air to circulate beneath the baking pan.

In testimony whereof I affix my signature in presence of two witnesses.

ROBERT BLUNT.

Witnesses:
MINNIE A. BLUNT,
MAY MURLEY.

Copies of this patent may be obtained for five cents each, by addressing the "Commissioner of Patents, Washington, D. C."